INVENTORS:
VINCENT S. PENOTE,
ALBERT R. ASKUE, AND
MELVIN K. REAR
By
Bates, Teare & McBean
ATTORNEYS United States Patent Office 2,940,188
Patented June 14, 1960

2,940,188
EXCAVATING MACHINE

Vincent Stephen Penote, Shaker Heights, Albert R. Askue, Euclid, and Melvin K. Rear, Chesterland, Ohio, assignors to The Cleveland Trencher Company, Cleveland, Ohio, a corporation of Ohio Filed May 7, 1957, Ser. No. 657,537

7 Claims. (Cl. 37—89)

This invention relates to trenchers of the ladder type and especially to such trenchers as are mounted on a tractor mechanism.

Excavating machines of the type with which this invention is concerned generally comprise a vehicular frame which supports a power unit and various digging and unloading mechanism. On one end of the frame, a movable boom is usually provided carrying a digging ladder which is adapted to be lowered into operating position and hoisted upwardly to inoperative position. The other end of the frame conventionally embodies an unloading or dump conveyor for receiving the dug material from the digging ladder and conveying said material exteriorly of the machine. In prior art arrangements, the inner or delivery end of the digging ladder must generally extend in overlapping relationship with the inner end of the unloading conveyor in order to be able to transfer the dirt from one unit to the other. Because of strength, weight and size limitations for the boom as well as for the excavating machine as a whole, the length of the digging ladder has been correspondingly restricted, and therefore the associated range and depth of digging has not always been satisfactory.

The part of the digging mechanism which projects above the surface of the ground only serves the purpose of a conveyor to carry the excavated earth to a point high enough to permit it to dump vertically onto the center of the conveyor element. Since all parts of the digging mechanism must be necessarily of a very rugged and heavy nature it is our purpose to minimize the length of the digging mechanism by bringing the elevating height above the ground line to its utmost minimum and to use the intermediate conveyor for bringing the excavated material to the desired height. Thus a great saving in weight is entailed at this end of the machine making it possible to construct a machine of inherently better balance.

The present invention provides a trench digging mechanism of the ladder type which includes a second or flight conveyor extending into coacting relationship with the digging ladder and the unloading conveyor, for facile and efficient transference of the dug material from the digging ladder to the unloading conveyor, and resulting in a greater digging depth for a particular length of digging ladder, as well as a lower over all height for the trencher mechanism. The invention also provides novel structure for rotatably mounting the digging ladder and associated boom on the trencher frame and novel means for actuating such structure, a novel supporting and actuating arrangement for pivotally mounting the unloading conveyor on the trencher frame, and various other structural and operational features that improve the efficiency and usability of the trencher mechanism.

It is therefore an object of the present invention to provide a trench digging machine of the ladder type which includes an intermediate flight conveyor coacting with the digging ladder and the unloading conveyor units, for facile transference of the dug material between such units and resulting in a greater digging depth without a proportionate increase in the length of the ladder, as well as providing greater capacity for the digging buckets of the ladder.

Another object of the invention is to provide a trench digging machine of the ladder type wherein the unloading or dump conveyor is mounted on rotary wheel structure for pivotal movement in a generally horizontal plane and wherein such pivotal movement is accomplished by actuating linkage in combination with a hydraulic piston and cylinder arrangement.

A further object of the invention is to provide an excavating machine of the latter mentioned type wherein the dump conveyor is adapted to fold intermediate the ends thereof for clearing exteriorly disposed obstructions, such as trees and poles, and wherein such folding is accomplished by means of hydraulically actuated piston and cylinder mechanism.

Another object of the invention is to provide an excavating machine of the trench digging type having conveyor units mounted on the machine and wherein such units are driven by means of fluid motor mechanism connected to a source of pressurized fluid, and including valve mechanism for controlling the flow of said fluid.

A still further object of the invention is to provide a trencher mechanism of the digging ladder type wherein the hoisting and lowering of the ladder is accomplished and guided by a pair of U-shaped yoke members pivotally mounted on the trencher frame and rotatably attached to the digging ladder and wherein such yoke members are actuated by hydraulic piston and cylinder mechanism controlled by a suitable valve arrangement.

A further object of the invention is to provide a trencher of the aforementioned type wherein means is provided for movably attaching the digging ladder to the outer ends of said yoke members to provide for generally reciprocating movement of the digging ladder with respect to one of such yoke members, to thereby furnish a novel arrangement for adjusting the position of the ladder with respect to the machine chassis and the ground.

Another object of the invention is to provide a trencher of the latter-mentioned type wherein said means includes a hydraulic actuated piston and cylinder arrangement controlled by suitable valve mechanism.

A still further object of the invention is to provide a trencher mechanism of the digging ladder type wherein the supporting truck on the outer end of the boom structure is adapted for attachment to the boom in a plurality of extended positions, to thereby provide an adjustable length boom.

Another object of the invention is to provide a trencher machine of the digging ladder type having novel adjustable width dirt deflector structure for returning the excess spoil which overflows on each edge of the excavation back to the trench during digging operations.

A still further object of the invention is to provide a trenching machine of the digging ladder type having a resiliently mounted telescoping-type boom for supporting the ladder, and wherein anti-wobbling bracket means is provided for stabilizing the telescoping sections of the boom against relative transverse and vertical movement with respect to one another.

Other features and advantages of the invention will be apparent from the following description taken in conjunction with the accompanying drawings which illustrate one embodiment of the invention. The essential features of the invention will be summarized in the claims.

Figures 2, 9, 10:
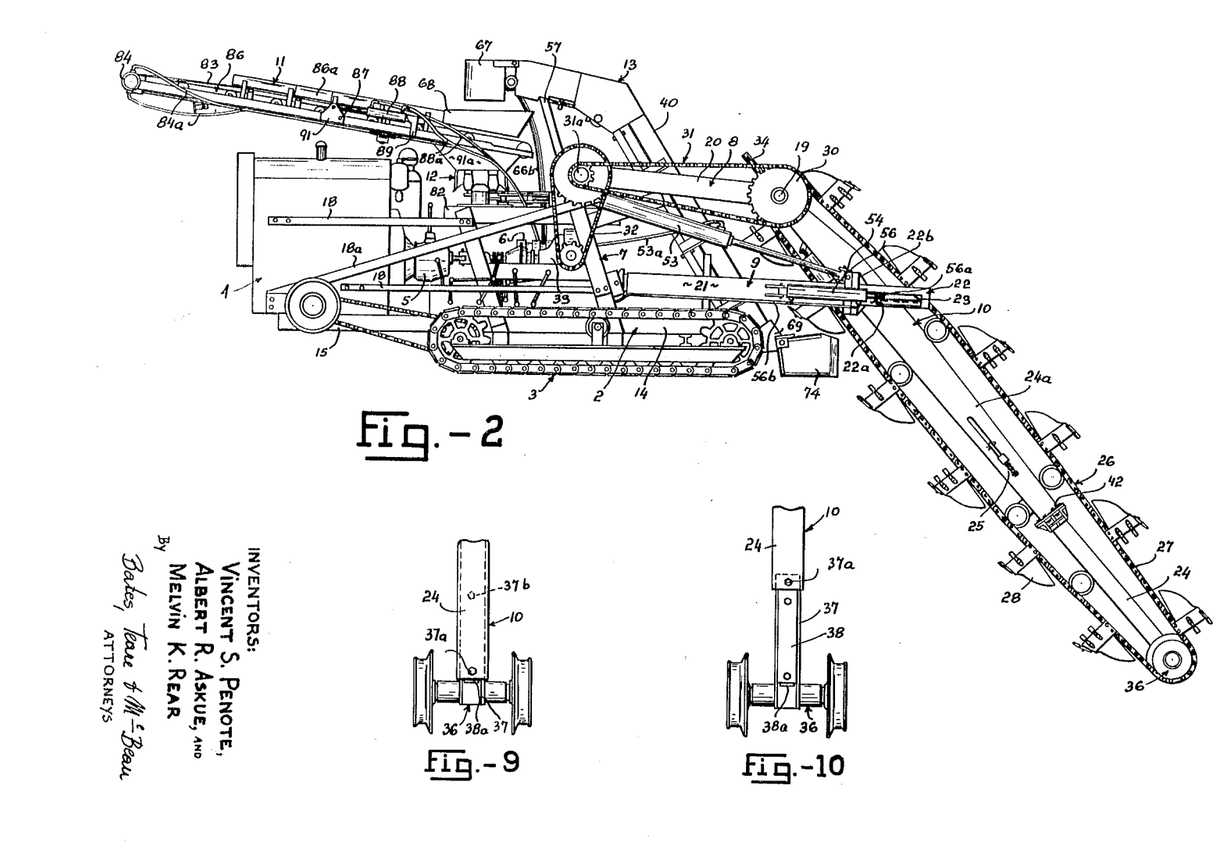
Figure 2 is a view generally similar to Figure 1 but illustrating the boom and digging ladder lowered into an operating position.
Figure 9 is a fragmentary top plan view of the outer end of the digging boom with the extendable end truck being disposed in its maximum retracted position in the boom.
Figure 10 is a fragmentary top plan view generally similar to Fig. 9 but illustrating the end truck attached to the boom in an extended position.

In the drawings the invention is illustrated as being applied to a crawler-propelled excavating machine. Such a trencher mechanism broadly comprises a frame structure 2 supported on suitable tractor treads 3, a motor 4, mounted on the forward end of the trencher, a power take-off unit 5 disposed behind the motor, a hydraulic pump unit 6 operatively connected to the power take-off unit 5, mast structure 7 for supporting thereon a pair of U-shaped hydraulically operated yoke members 8 and 9 which support and actuate the movement of digging boom mechanism 10, a hydraulically actuated dump or unloading conveyor 11, which is pivotally mounted for generally horizontal movement on rotary wheel mechanism 12, and a flight conveyor 13, which is adapted to extend between the inner end of the digging boom 10 and the inner end of the dump conveyor 11 for efficient and facile transference of the dug material from the digging boom to the unloading conveyor during digging operations. This is best shown in Figure 2.

Frame structure 2 is of more or less conventional character and comprises a base portion 14 (Fig. 1) and forwardly extending sills 15 for mounting the motor 4 thereon.

Figure 3:
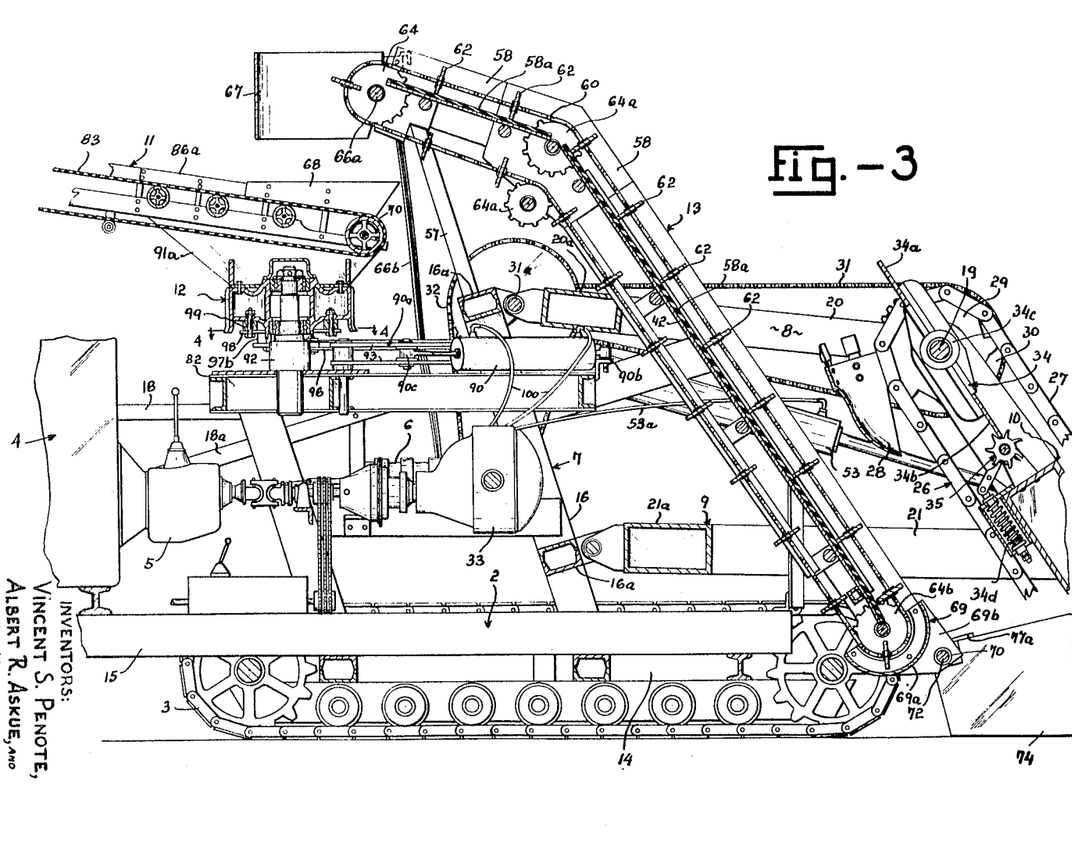
Figure 3 is a partially sectioned, enlarged, side elevational, fragmentary view of the trencher mechanism illustrating in somewhat greater detail certain structural features of the mechanism.

Mast structure 7 comprises a plurality of upwardly and generally forwardly extending arm elements 16 connected by transversely extending cross-members 16a (Fig. 3). Mast structure 7 is reinforced by a series of cooperating steel braces 18 and 18a which extend generally between the motor structure 4 and the mast. Mounted adjacent the top of mast structure 7 for pivotal movement in a generally vertical plane is the aforementioned generally U-shaped upper yoke member 8. Upper yoke member 8 comprises side-arm portions 20 and a transverse base portion 20a connecting the arm portions. The upper end of the arm portions 20 are pinned or hinged to the inner or discharge end of digging boom mechanism 10 as by means of transversely extending shaft 19. Pivotally mounted on the lower portion of mast structure 7 for movement in a generally vertical plane is the aforementioned lower U-shaped yoke member 9 comprising side-arm portions 21 and transversely extending base portion 21a. In the embodiment shown, there is attached to the outer end of each of arm portions 21, a yoke arm extension member 22 comprising a body section 22a and a base section 22b. Body section 22a has an elongated lengthwise extending slot 23 therein for a purpose to be hereinafter set forth while base portion 22b is adapted for attachment by any suitable means to the associated arm of yoke 9. It will be understood, of course, that extension members 22 could be formed as an integral part of the yoke arms rather than being separable as shown. However, such separable construction facilitates assembly of the parts of the excavator.

Boom 10 is of preferably box-section construction comprising an outer or lower portion 24 (Fig. 2) which is telescoped into the upper or inner portion 24a and is spring mounted or loaded therein by means of spring and shank structure 25 (Figs. 1 and 2), the latter arrangement being well known to those skilled in the art, and being generally illustrated in United States Patent No. 1,832,787. Boom 10 supports an endless chain digger unit 26 comprising parallel chains 27 carrying thereon a series of digging buckets 28 of more or less conventional character. Chains 27, at the inner end of boom 10, are mounted upon sprockets 29 (Fig. 3) which are driven by the shaft 19 and outer actuating sprockets 30 (Fig. 1) mounted on the ends of the shaft. Sprockets 30 are driven by means of a suitable connection (illustrated in the drawing by reference number 31) to a counter-shaft and sprocket assembly 31a (Fig. 1) which extends transversely of mast structure 7 and which is rotatably mounted thereon. Shaft and sprocket assembly 31a is, in turn, driven by means of a suitable connection (illustrated in the drawings by reference number 32) to the digging differential 33 disposed adjacent pump unit 6.

Mounted on the inner end of boom 10 intermediate chains 27 is a bucket cleaning mechanism 34 of the paddle type which insures removal of the dug material from the buckets. Mechanism 34 comprises a pair of oppositely extending paddles 34a and 34b pivotally mounted on shaft 19 by means of circular portion 34c (Fig. 3). One of the paddles extends outwardly of the inner end of digger unit 26 and is adapted to be received in the bucket cavity during movement of chains 27, while the other of the paddles engages a release mechanism 35. Release mechanism 35 comprises a ratchet and pawl arrangement for ordinarily preventing pivotal movement of the paddles about shaft 19. However, in the event that the material sticking to the inner surface of the bucket is of such a type or consistency that it cannot be wiped out by the outwardly extending paddle 34a but instead exerts a resistance that may possibly damage the mechanism, paddle 34b trips the ratchet and pawl mechanism by moving the ratchet in a counterclockwise direction (as viewed in Figure 3) against the resistance to compression of spring 34d, and thereupon paddle 34a moves about shaft 19 with the bucket. Paddle 34a is thus carried around with the bucket until it moves into engagement with the ratchet and pawl mechanism and paddle 34b pivots to extend outwardly of the end of the digging unit, in which position it is operative to clean the buckets as they rotate around the inner end of the boom. Thus, an effective bucket-cleaning mechanism is provided in combination with a trip mechanism to prevent damage to the cleaning paddles.

The truck 36 on the outer end of boom 10 is detachably mounted on the boom and comprises a central generally elongated body portion 37 disposed in telescoping relationship with the boom. Suitable means 37a such as bolts and nuts connect the truck to the boom (Figs. 9 and 10). If it is desired to lengthen the boom, the connecting means 37a is removed and the truck body portion is pulled or extended outwardly to thereby increase the effective length of the boom and then is once more attached to the boom proper, suitable openings 37b being provided in the body portion of the truck 36 for receiving the attaching means in the extended position of the truck. The endless chains 27 of the digging unit 26 will, of course, have to be correspondingly increased or decreased in length upon further outward or inward positioning of the truck. In order to reduce shearing stresses on the attaching bolts 37a when the truck is in fully extended position, an abutment plate 38 is attached by any suitable means to the upper surface of the truck body portion. The forward end of spacer plate 38 abuts against stop 38a on the truck body and its rearward end abuts against the end of boom 10 to thereby transmit the stresses during digging operations directly from the truck body to the end of the boom and not through the truck attaching means 37a. There is provided, therefore, a novel telescoping truck and boom arrangement for easily changing the effective length of the digging unit.

Figures 1, 11, 11A, 12:
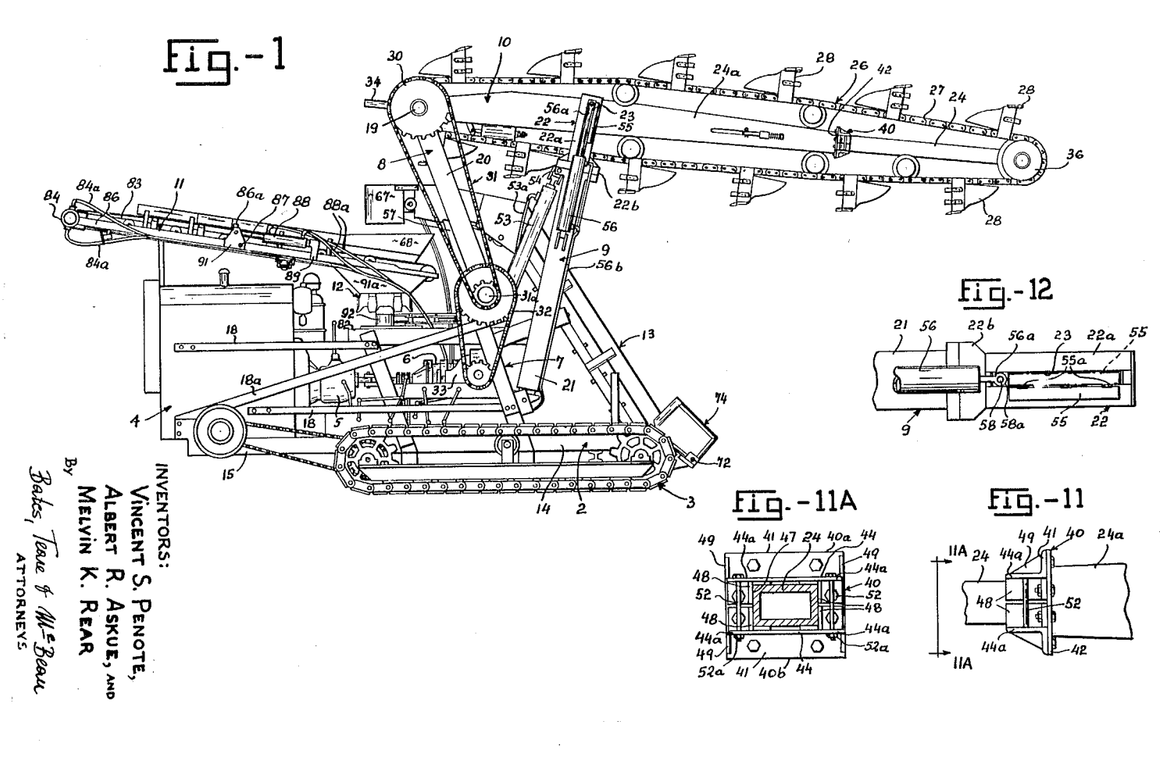
Figure 1 is a side elevational view of an excavating machine embodying the invention with the boom and digging ladder being disposed in maximum raised position.
Figure 11 illustrates a fragmentary side elevational view of the resiliently mounted telescoping sections of the boom with the anti-wobbling bracket means attached thereto to prevent relative transverse and vertical movement between such sections.
Figure 11A is a fragmentary front elevational view taken generally along line 11A—11A of Figure 11, looking in the direction of the arrows.
Figure 12 is a fragmentary view of the yoke arm extension section of the lower yoke member and the associated hydraulic cylinder and piston unit, illustrating its connection to the digging ladder of the trencher and showing the pivotable latch stop mounted on the extension section which is receivable in a slot in the latter mentioned section for eliminating the application of stress to said hydraulic unit during digging operations. The operating position of the stop member is shown in dot-dash lines.

At the telescoping juncture of the outer section 24 of the boom with the inner section 24a thereof, an anti-wobbling bracket means 40 is provided (Figs. 11 and 11A). Bracket means 40 which is preferably of fabricated construction comprises separate upper and lower portions 40a and 40b. Each portion comprises a generally vertical rear wall 41 which is adapted for attachment by any suitable means to flange 42 on the outer end of inner section 24a of the boom. Generally horizontal wall 44 of each of the bracket portions includes laterally extending portions 44a which have vertically extending openings therein. Walls 41 are each provided with a generally central recess 47 extending inwardly from a periphery thereof which is adapted to receive the outer section of the boom therein. Extending from wall 44 and disposed adjacent the peripheral side edges of recess 47 are generally vertical walls 48 which encompass in closely confronting relationship the sides of the outer section 24 of the boom structure. Laterally spaced flanges 49 resist bending stresses applied to the bracket portions. Vertical bolts 52 passing through the aforementioned openings in lateral sections 44a of the bracket portions in combination with nuts 52a provided means for clamping the bracket portions 40a and 40b against the outer section 24 of the boom to thus resist relative transverse and vertical movement between the boom sections. It will also be seen that the vertical walls 48 on the bracket portions aid to eliminate the play or shake between the resiliently mounted telescoping sections of the boom.

Hydraulically actuated, double acting, piston and cylinder units 53 are disposed on both sides of the digger unit intermediate yokes 8 and 9 to actuate the latter for raising and lowering boom 10. The inner end of each of units 53 is pivotally mounted on mast 7 generally adjacent the juncture of the associated one of the diagonal braces 18a with the mast structure, while the outer or plunger end of the unit is rotatably attached to the associated sidearm 21 of lower yoke 9 by means of bracket 54. Feed lines 53a connect units 53 to pump unit 6 for supplying pressurized fluid to the cylinder, and suitable valve means is provided for controlling the flow of such fluid. Another hydraulically actuated, double acting cylinder and plunger unit 56 is mounted on the outer portion of each of arms 21 of lower yoke 9 adjacent the aforementioned slot 23 in the detachable extension portion 22 of the arm. The outer, or plunger ends 56a of hydraulic units 56 are rotatably connected to fixed lugs or pins 58 projecting outwardly of the sides of boom structure 10 and through the slots 23 in the adjacent extension portions 22 of the yoke arms.

Referring to Fig. 12 of the drawings, which is a fragmentary view illustrating the connections of the hydraulic units 56 to the boom structure, it will be seen that lugs 58 also extend through bearing blocks 58a which are received in sliding relationship in the aforementioned slots 23 in yoke arm extension members 22. Hinged to body portion 22a of each extension member 22 adjacent one edge of slot 23 is a latch stop member 55. Member 55, in the embodiment shown, comprises a tube of generally rectangular configuration in vertical cross section, pivotally mounted, as at 55a, at one of the corners thereof to body portion 22a of extension member 22. When latch member 55 is in operating position (i.e. received in slot 23) as shown in dot-dash lines in Fig. 12, and the digging mechanism is in digging operation, all of the stress due to digging is transferred from boom lugs 58 and bearing blocks 58a through latch members 55 direct to the extension members 22 and none of the stress is applied to hydraulic units 56, thereby preventing considerable wear and tear on the latter units. To unlatch the connection between the boom and hydraulic units 56 stop members 55 are manually pivoted outwardly of slots 23 to inactive position, and their eccentric connection to extension members 22 maintains them in inactive position. Lugs 58 and associated bearing blocks 58a are adapted for reciprocating movement in slots 23 upon actuation of hydraulic units 56 to pivot the digging unit 26 a limited amount in a generally vertical plane about the boom's hinge connection with shaft 19. Feed lines 56b connect each of hydraulic units 56 with the aforementioned pump mechanism 6 and in combination with suitable valve mechanism control the flow of pressurized fluid to the units. The latter arrangement will hereinafter be more thoroughly discussed in connection with the operation of the excavating machine.

Mounted adjacent the rearward end of base 14 of the trencher frame 2 and extending upwardly and forwardly therefrom is the aforementioned flight conveyor 13. The upper or inner end of the flight conveyor is supported on the trencher frame by means of generally vertically extending bar members 57 (Fig. 3). The flight conveyor is of the trough-type comprising side walls 58 and base portions 58a (Fig. 3). The trough of conveyor 13 is preferably lined with a plastic-like material such as rubber and contains strands of endless chain 60 which carry transversely extending flight members 62 therebetween. Flight members 62 are preferably comprised of frangible material such as wood and are adapted to be expendable if hit and fractured by falling material such as rocks, etc. from the digging boom, thereby confining all damage to the flight elements alone. Chains 60 are mounted on a series of sprockets 64, 64a and 64b and driven by means of a fluid motor unit 66 (Fig. 7) suitably connected to shaft 66a to which upper sprockets 64 are attached. Feed lines 66b connect motor unit 66 to pump mechanism 6 and in combination with suitable valve mechanism control the flow of pressurized fluid to the motor. It will be noted that the trough of conveyor 13 is comprised of an upper and a lower section, the lower section extending in a generally upward and forward direction while the upper section extends generally diagonally forwardly from the lower section. The latter construction has been found to provide a suitable arrangement for effective operation of the chain and associated flight members in the trough. Sprockets 64a are positioned at the general juncture of the upper and lower sections of the trough to permit facile movement of the chains 60 and associated flight members 62 from one section of the trough to the other section thereof.

The upper end of conveyor 13 is provided with an arcuate shaped baffle 67 which causes the dug material to drop down to the gathering pan 68 at the rearward end of the unloading conveyor 11. Baffle 67 is pivotally mounted adjacent the top rearward ends thereof to side-sections 58 of the flight conveyor so that the baffle can lift upwardly to permit the passage therethrough of large stones or other oversized material.

Figure 5:
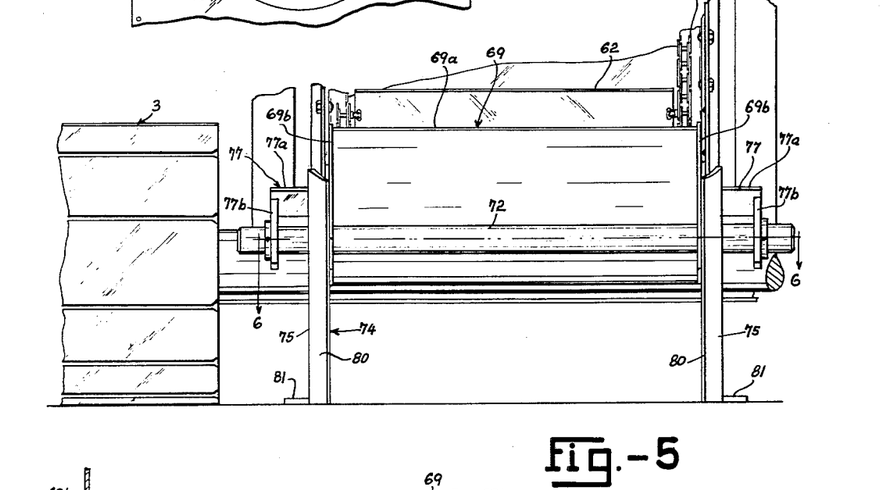
Figure 5 is a fragmentary rear-end elevational view illustrating the windrow or dirt deflector and flight conveyor assembly arrangement.

The lower or outer end of flight conveyor 13 is provided with a U-shaped flight guard mechanism 69 (Fig. 5) which protects the wooden flights 62 from damaging engagement with exteriorly disposed obstructions, especially during actuation of the conveyor. Mechanism 69, which is preferably of fabricated construction, comprises a U-shaped main shell section 69a and side sections 69b. Side sections 69b are attached by any suitable means such as bolts to the side sections 58 of the flight conveyor to maintain the flight guard in operative position. Each side section 69b comprises a rearwardly extending portion provided with an opening 70 which is adapted to receive a shaft 72 therethrough.

Figure 6:
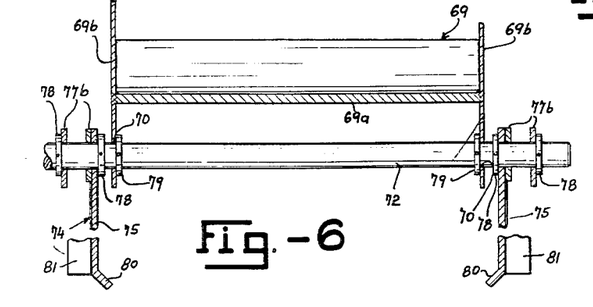
Figure 6 is a horizontal sectional view taken generally along line 6—6 of Figure 5.

Mounted on shaft 72 is a dirt deflector or windrow mechanism 74 (Figs. 5 and 6) which is adapted to keep the spoil to a minimum and closer to the trench during digging operations. Deflector 74, which is preferably of fabricated construction, comprises a pair of spaced generally vertically disposed plates 75 having outwardly extending lateral mounting brackets 77 on the outer sides thereof. Each bracket in the embodiment shown comprises a generally diagonally extending top section 77a and generally vertically disposed side sections 77b which are spaced from one another. Side sections 77b of the brackets and plates 75 have horizontally aligned openings therein for receiving the aforementioned shaft 72 (Fig. 6) and are adapted to be mounted between detachable abutment rings 78 on the shaft for maintaining deflector 74 in proper position. Movable rings 78 provide a convenient means for changing the transverse spacing between plates 75 to thereby furnish an adjustable width dirt deflector for use with various widths of trenches. Abutment rings 79 on the shaft are adapted for engagement with the side-sections 69b of the flight guard to maintain the shaft 72 in centralized position with respect to the flight guard. As can be seen from Figs. 5 and 6 of the drawings the rearward ends of plates 75 are bent as at 80 to converge inwardly, to direct the spoil back into the trench. A laterally extending, ground engaging shoe 81 is provided on the rearward end of each of plates 75 to stabilize the latter when in operating position. When deflector 74 is in operating position, it will generally cause dug material which inadvertently falls off the rearward end of flight conveyor 13 to drop straight down where it can be once again carried to conveyor 13 by the digging ladder. When the deflector is not required for the latter purpose it can be pivoted upwardly about shaft 72 to inoperative position as shown in Fig. 1 of the drawing.

Figures 7, 8:
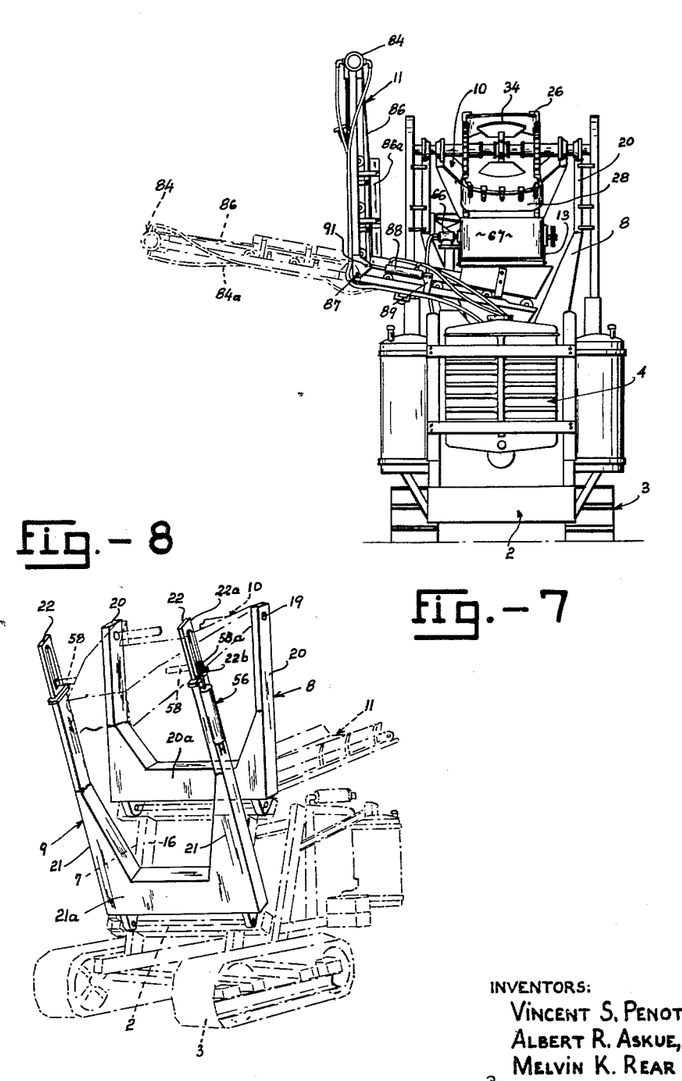
Figure 7 is a front end elevational view of the trencher mechanism illustrating the folded position of the dump conveyor which enables the operator of the machine to swing the conveyor around a post or tree. The operating position of the dump conveyor is shown in dot-dash lines.
Figure 8 is a rear isometric view of the trencher machine with certain parts being removed to better illustrate the novel twin yoke supporting and actuating arrangement for the boom and associated digging ladder, all of the structure of the trencher except the yoke mechanism being shown in dot-dash lines.

The aforementioned pivot or discharge conveyor 11 is mounted on the generally forward end of the trencher mechanism on raised platform structure 82. (Figs. 1, 2 and 3.) The inner or rearward end of the dump conveyor is located beneath the upper or inner end of the flight conveyor for receiving in pan portion 68 thereof the dug material from the flight conveyor. Belt element 83 is suitably mounted on rollers and is driven by means of a fluid motor 84 suitably connected to the forward roller of the conveyor (Fig. 1). Motor 84 is connected by feed lines 84a to pump unit 6 with suitable valve mechanism for controlling the flow of pressurized fluid to the motor. Conveyor 11 is formed in two sections and is hinged adjacent the central portion thereof as at 87 so that the outer portion 86 can be folded upwardly to permit the trencher to pass obstructions such as trees, poles, etc. The side plates 86a of conveyor 11 are suitably hinged to provide for the folding of the outer portion 86. The folding of the conveyor 11 is accomplished by means of double acting hydraulic cylinder and plunger mechanism 88 mounted on one side of the conveyor. Mechanism 88 is connected to pump unit 6 by means of feed lines 88a and a suitable valve device is provided for controlling the flow of pressurized fluid to unit 88. The rearward end of unit 88 is pivotally mounted on bracket 89 attached to the inner section of the conveyor frame and the outer or plunger end of unit 88 is connected to pivot flange 91 which is rigidly attached to the outer portion 86 of the conveyor. Upon inward movement of the plunger, the outer portion 86 of the conveyor is folded about the hinged connection 87 to approximately an 80 degree angle (Fig. 7). Outer portion 86 of conveyor 11 is also adapted to move slightly downwardly from its co-planer relationship with the inner portion thereof upon outward movement of plunger of unit 88 to thus provide limited downward as well as upward adjustment of the conveyor 11 for different height trucks or other vehicles which receive the dug material.

Figure 4:
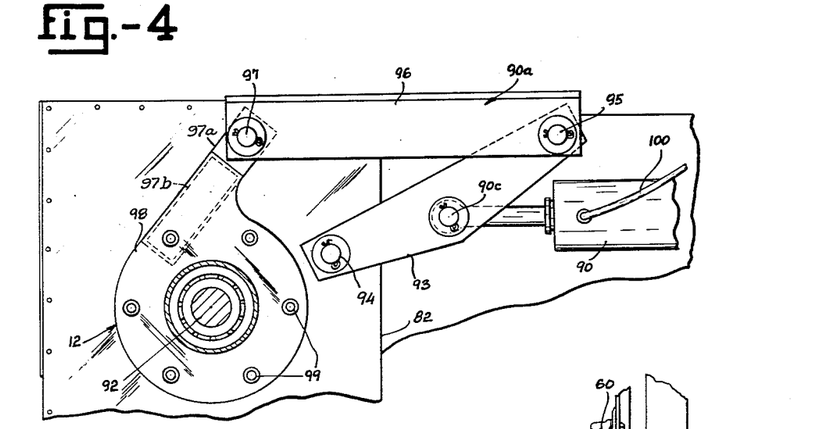
Figure 4 is a horizontal sectional view taken generally along line 4—4 of Figure 3 looking in the direction of the arrows and illustrating the structural arrangement for actuating the pivotal mounting mechanism of the unloading conveyor of the excavator.

It is a characteristic of the dump conveyor mechanism disclosed in this application that it may be swung outside the outline of the trenching machine to various positions in an arc extending over 180 degrees. To accomplish this, the rearward end of conveyor 11 is mounted by plate members 91a upon the aforementioned rotatable wheel and bearing structure 12 (Figs. 1 and 3) which is adapted to rotate about vertical shaft 92 mounted on raised support structure 82. The wheel is of a webbed or spoked design and is mounted on heavy-duty anti-friction bearings for providing long-wearing characteristics. Actuating means for pivotal movement of the conveyor is provided in the form of hydraulic cylinder and plunger unit 90 in conjunction with compound linkage 90a. Referring to Figs. 3 and 4, the rearward end of the hydraulic unit 90 is pivotally mounted as at 90b to the raised support structure 82 and at its forward or plunger end is rotatably pinned as at 90c to the generally central portions of vertically spaced rocker arms 93. One end of each of arms 93 is rotatably pinned as at 94 to the raised support 82 and at the other end thereof is rotatably pinned as at 95 to the ends of a pair of vertically spaced link arms 96. The other ends of arms 96 are rotatably pinned as at 97 to an arm 97a attached to a spacer block element 97b which in turn is attached to the underside of a disc plate 98 which is attached as at 99 to wheel structure 12. Upon outward movement of the plunger of unit 90, the linkage 90a pivots forwardly to cause rotation in a counter-clockwise direction (as viewed in Figure 4) of the wheel structure 12 and supported conveyor mechanism 11 about shaft 92. Upon rearward movement of the plunger element of unit 90, the wheel is caused to rotate in the opposite, or a clockwise direction. Unit 90 is connected by means of feed lines 100 to the pump mechanism 6 for actuation of the cylinder and is provided with suitable valve mechanism for properly controlling the flow of pressurized fluid to the cylinder of the unit. It will be seen, therefore, that there is provided a rugged and effective compound linkage and hydraulic cylinder-plunger arrangement for operating the rotatable wheel mechanism on which the dump conveyor is mounted for pivotal movement, the linkage 90a changing the reciprocating motion of the plunger to the rotary motion of the wheel support structure.

The operation of the trencher mechanism is as follows: In the inoperative position of the trencher with the digging boom raised upwardly as generally shown in Figure 1, it will be seen that the hoist or boom actuating hydraulic cylinder units 53 are in fully retracted position and that the associated yoke arms 20 and 21 on each side of the trencher generally diverge in an outward direction with respect to one another. When in raised position the digging boom 10 is in a fairly stable condition with a substantial portion of the weight of the boom disposed rearwardly of the outer or lower yoke 9 and generally centrally of the trencher frame 2. It will also be observed that in the latter position of boom 10, the yoke arms 20 of upper yoke 8 lie in a transverse plane that extends generally parallel to the plane of mast structure 7 while arms 21 of lower yoke 9 lie in a transverse plane disposed at an angle with respect to the aforementioned plane of mast structure 7.

In Figure 1, the hydraulic cylinder unit 56 mounted on arm 21 of lower yoke 9 is shown in fully extended position, thereby pivoting boom structure 10 upwardly about mounting shaft 19 to its highermost position.

When it is desired to place the digging boom in operative or digging position, the aforementioned valve mechanism which supplies pressurized fluid from pump 6 to the cylinders of units 53 are actuated, the plunger ends of hydraulic units 53 moving outwardly to cause yokes 8 and 9 to rotate downwardly or in a clockwise direction (as viewed in Figure 1), about their pivotal connections to mast structure 7. The boom is then in substantially the position shown in Fig. 2 with the plungers of hydraulic units 53 being fully extended.

It will be observed that in the latter position the associated yoke arms 20 and 21 on each side of the trencher extend longitudinally in generally parallel relationship with respect to one another and position the digging unit of the boom generally rearwardly of the tractor treads 3. In prior art arrangements wherein the inner or upper end of the digging boom extended into cooperating relationship with a forwardly mounted dump conveyor, the digging unit generally passed between the tractor treads of the mechanism and thus the transverse width of the digging bucket was limited to the available space between such tractor treads. In the instant arrangement the hydraulically activated, double supporting, rotatable yoke structure permits placement of the digging unit behind the treads of the crawler mechanism and thus permits the use of buckets having a greater width and thus greatly increased capacity. It will also be seen that the novel double yoke supporting arrangement for the digger unit in combination with the intermediate flight conveyor mechanism, permits a lower over-all height for the trencher which provides for operation of the machine under restricted height conditions. All of the stress during digging operations is transferred from the digging unit to the yokes 8 and 9 and thence to the mast and frame structure of the machine, none being applied to the hydraulic units 53.

It will be noted in Fig. 2 that the plunger of hydraulic unit 56 is shown as being in partially extended position. It is preferable that the plungers of these yoke arm hydraulic units be in fully retracted position during digging operations and that the aforementioned latch members 55 be in locking position in the slots 23 in yoke arm extension portions 22, in order that no stress is applied to units 56 during digging. However, if for some reason it is desirable to increase or decrease the digging angle of boom 10 without hoisting the boom upwardly by means of hydraulic units 53, latch members 55 can be moved to inactive position and the aforementioned associated valve mechanism can be operated, thereby supplying pressurized fluid from pump unit 6 to the cylinders of units 56 through their associated feed lines 56b which, in turn, causes the boom to pivot a limited amount about its hinged connection to supporting shaft 19.

The digging ladder or unit 26 is driven, in the embodiment shown, by the sprocket and chain system 30, 31, 31a suitably connected to the digging differential 33. Upon actuation of a suitable clutch mechanism, the digging unit is driven by the digging differential in a generally clockwise direction and as the digging buckets unload the dug material at the upper or inner end of digging unit 26, the dirt drops down onto the flight conveyor 13 which carries it upwardly and forwardly to deposit it on the unloading conveyor 11. Conveyor 13 as aforementioned is separately powered by a fluid motor mechanism of preferably the gear type, mounted on the upper end of the conveyor. The dirt then drops down into receiving box portion 68 of the dump conveyor 11 and is carried forwardly by belt element 83 thereof to a position forwardly or on either side of the trencher machine. Conveyor 11, as aforesaid is powered by a separate fluid motor of preferably the gear type, mounted on the forward end of the conveyor. The forward mounting of this fluid motor provides a pulling action on belt element 83 which effectively causes movement of the latter. If it is desired to change the horizontal position of the discharge end of conveyor 11, the aforementioned valve mechanism associated with hydraulic unit 90 is actuated thereby supplying pressurized fluid to the cylinder thereof which, in turn, actuates the associated compound linkage system 90a to cause pivoting of wheel structure 12 about shaft 92. Also, if it is desired to fold or raise the outer end of conveyor 11, pressurized fluid is supplied to double-acting hydraulic unit 88 thereby causing the plunger to retract or move inwardly into the cylinder, to lift outer end portion 86 of the conveyor upwardly to the position shown in Fig. 7 of the drawings.

When it is desired to raise boom 10 and associated digging unit 26 out of digging position in the trench, stop latches 55 may be moved to inactive position and hydraulic units 56 mounted on arms 21 of lower yoke 9 may be actuated, thereby slightly pivoting the boom a limited amount about support shaft 19 and moving buckets 28 away from digging engagement with the confronting end wall of the trench. With the digging unit thus freed from biting contact with the dirt, the aforementioned control valve mechanism associated with hydraulic units 53 is actuated to supply pressurized fluid to the cylinders thereof thereby causing the plunger elements of the units to retract, to hoist the boom in a forward and upward direction, the yoke members 8 and 9 pivoting about their pivotal mountings on mast structure 7 until returned to their divergent position as shown in Fig. 1. It will be understood that hydraulic units 56 on the lower yoke 9 provide means for not only breaking the buckets of the digging unit away from biting contact with the dirt but also provide, within the limits of the movement of the plungers of units 56, an effective means for angling digging unit 26 about mounting shaft 19 to change the position of unit 26 with respect to the machine chassis and the ground.

In roading condition of the excavator, the boom and associated digging ladder are generally placed in the position shown in Fig. 1 except that hydraulic units 56 are preferably in fully retracted condition. However, if a longer boom is utilized than that illustrated, units 56 can be actuated to insure that the outer end of the boom will clear the ground.

Figure 13:
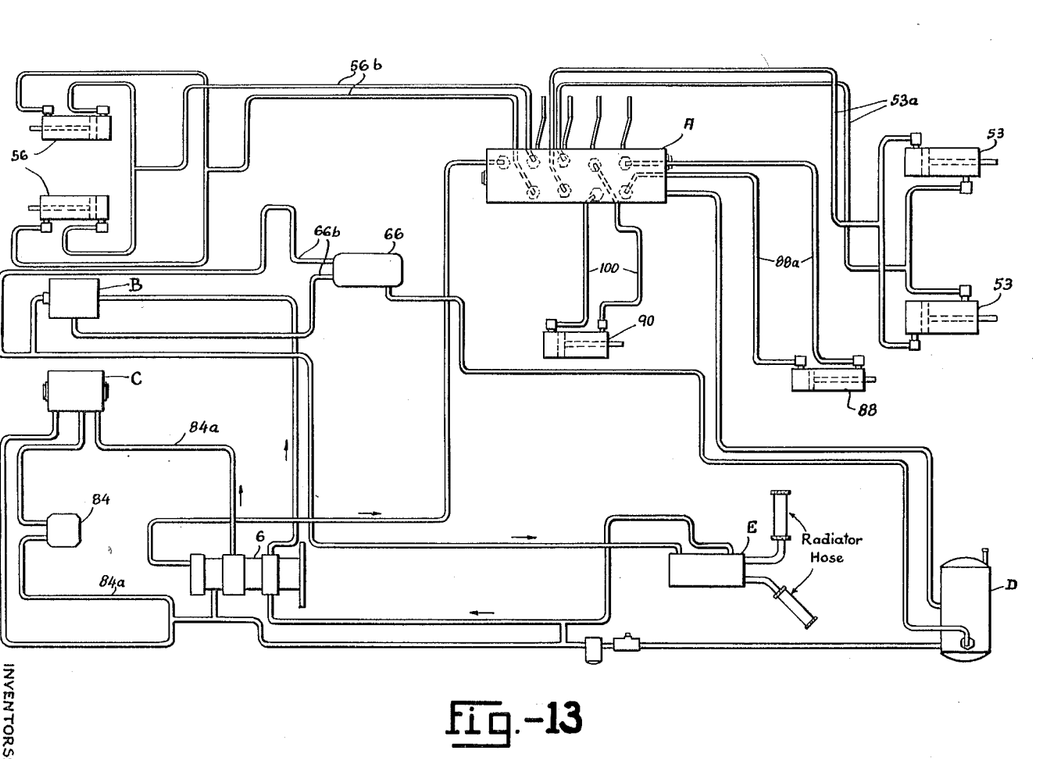
Figure 13 is a diagrammatic illustration of an arrangement of a hydraulic system that may be used to control the various hydraulic units of the excavating machine.

Referring to Fig. 13 which schematically illustrates one arrangement of hydraulic control system that may be used to operate the various hydraulic mechanisms of the machine, it will be seen that valve mechanism A, which can be of any conventional type controls the flow of pressurized fluid from pump unit 6 to hydraulic cylinder units 53 and 56 associated with the yoke structure, and hydraulic cylinder units 88 and 90 used to respectively fold the dump conveyor and pivotally move the latter in a generally horizontal plane. Valve mechanisms B and C, which can also be of any conventional character, control the flow of pressurized fluid from the pump unit 6 to the gear type fluid motors 66 and 84 which respectively drive the flight and dump conveyors. Connected in the hydraulic circuit is a reservoir D of ample size for both supplying fresh oil and adequately cooling the system. A heat exchanger E of any conventional type is connected in series with the engine radiator cooling system in the flight conveyor circuit to constantly cool the oil in the latter circuit.

From the foregoing description and accompanying drawings it will be understood that the invention provides a novel construction of trencher mechanism, wherein the digging unit is mounted on a double yoke system which is hydraulically actuated for pivotal movement about the mast structure of the trencher, and an intermediate flight conveyor is provided for facile transference of the dirt from the digging unit to the unloading conveyor, thereby reducing the overall height of the mechanism, and making it more beneficial when operating under close-quarter conditions, as well as providing a greater digging depth for a predetermined length of the digging boom. The invention also provides an unloading conveyor, which not only is movable generally horizontally in an arc extending outside the outline of the trencher, but is also foldable in a vertical direction to enable passage of the trencher past exteriorly disposed obstructions and wherein the conveyor mechanisms are powered by separately actuated fluid motors attached to a pumping unit mounted on the trencher. In addition, the invention provides other novel structural features for improving the efficiency and useability of the trencher.

The terms and expressions which have been employed are used as terms of description and not of limitation and there is no intention in the use of such terms and expressions of excluding any equivalents of the features shown and described or portions thereof but it is recognized that various modifications are possible within the scope of the invention claimed.

We claim:

1. In an excavating machine, a frame, a yoke member pivotally mounted on said frame, said yoke member comprising a pair of transversely spaced arms, each of said arms having an elongated slot in the outer end thereof, a digger unit disposed between said arms and being supported thereby, said digger unit including laterally extending lugs, said lugs extending through said slots, a bearing block disposed in each of said slots and rotatably connected to the associated one of said lugs, and means for causing said blocks and lugs to reciprocate in said slots to adjust the position of said unit with respect to said machine.

2. In an excavating machine in accordance with claim 1 wherein each of said arms comprises an inner portion and an outer portion detachably connected to the inner portion, said slot being disposed in said outer portion and wherein said means comprises an hydraulically actuated piston and cylinder unit mounted on said inner portion and operatively connected to the associated one of said lugs, said unit being connected to a source of presurized fluid and valve means for controlling the flow of fluid to said unit.

3. An excavating machine in accordance with claim 1 wherein latch means is hinged to said yoke adjacent an edge of each of said slots, said latch means being receivable in said slot between said bearing block and the outer end of said slot and in abutting relationship therewith to transmit stress during digging operations from said lug and bearing block to said yoke.

4. In an excavator for making trenches comprising a mobile base frame, a ladder type digger mechanism, means adjacent the rearward end of said frame for supporting said mechanism thereon, said means being operative for raising said mechanism from the trench to a generally overhead position with respect to said frame and for lowering said mechanism into digging position in the trench wherein said mechanism is disposed in a substantially diagonally forwardly vertical position and generally rearwardly with respect to said frame, said means comprising generally upright mast structure mounted on said frame and a pair of yoke members pivotally mounted on said mast structure in generally vertically spaced relation for pivotal movement in a generally vertical plane, said yoke members adjacent their outer ends being pivotally connected to said mechanism with the uppermost of said yoke members being pivotally connected to said mechanism adjacent the discharging end of the latter, the pivotal connections of said last mentioned yoke member to said mechanism being disposed below a horizontal plane passing through the pivotal connection of said last mentioned yoke member to said mast structure when said mechanism is in lowermost digging position in the trench whereby a minimum predetermined portion of the discharging end of said mechanism projects above ground level in said last mentioned position, an unloading conveyor mounted on said frame forwardly of said mast structure, and a second conveyor mounted on said frame, the rearward end of said second conveyor projecting into material receiving relation with respect to the discharging end of said digger mechanism and the forward end of said second conveyor projecting into material discharging relation with respect to said unloading conveyor, for transference of the dug material from said digger mechanism to said last mentioned conveyor.

5. In an excavator in accordance with claim 4, wherein the lowermost of said yoke members includes means at the pivotal connections thereof to said digger mechanism for selectively reciprocating said digger mechanism with respect to said last mentioned yoke member in a direction generally lengthwise of said last mentioned yoke member.

6. A support for the digging unit of a trenching machine comprising a mobile base including a mast structure, a pair of yoke members pivotally mounted on said mast structure for movement in a generally vertical plane, said yoke members being disposed in generally vertically spaced relation with respect to one another and each comprising transversely spaced arm portions, said arm portions adjacent their outer ends being rotatably connected to said unit, each of said arm portions of at least one of said yoke members having an elongated slot adjacent the outer end thereof, said unit having laterally extending lugs on opposite sides thereof and extending through the associated of said slots, fluid powered reciprocal motor means mounted on each of said arm portions of said one yoke member and being operatively connected to the associated of said lugs, for providing limited pivoting of said unit with respect to the other of said yoke members.

7. In an excavator for making trenches, comprising a mobile supporting frame, a digger mechanism mounted on said frame adjacent one end thereof, means for raising said mechanism to inoperative position and lowering said mechanism to operative digging position, means for driving said digger mechanism, a conveyor mounted on said frame and extending into coacting relation with said digger mechanism for transference of dug material from said digger mechanism to said conveyor, means for driving said conveyor, said conveyor sloping upwardly away from said digger mechanism when the latter is in said operative position, said conveyor having its lower end in relatively closely spaced proximity to ground level and in non-interferring relation with said frame, a shaft supported by said lower end of said conveyor and extending transversely of the latter, and dirt deflector means mounted on said shaft, said dirt deflector means comprising a pair of generally vertically disposed plates having laterally positioned bracket portions attached thereto, said plates being adapted for engagement with the ground on opposite sides of a trench dug by said excavator, each of said bracket portions comprising at least one generally vertical side wall and a generally horizontal wall connecting said side wall to the respective one of said plates, said side wall and said respective plate having generally horizontally aligned openings therein for receiving in mounting relation said shaft, said deflector means being operable to cause dug material inadvertently dropping down from the conveyor and digger mechanism to be directed back into the trench.

References Cited in the file of this patent

UNITED STATES PATENTS

| | | |
|---|---|---|
| 283,765 | Ewing et al. | Aug. 28, 1883 |
| 304,998 | Everett | Sept. 9, 1884 |
| 688,684 | Piez | Dec. 10, 1901 |
| 769,105 | McCarthy | Aug. 30, 1904 |
| 793,557 | Adams et al. | June 27, 1905 |
| 799,753 | O'Connor | Sept. 19, 1905 |
| 987,249 | Matthies | Mar. 21, 1911 |
| 1,020,542 | Droegemeier | Mar. 19, 1912 |
| 1,414,832 | Rossi et al. | May 2, 1922 |
| 1,630,231 | Vaughn | May 24, 1927 |
| 1,731,393 | Paradise | Oct. 15, 1929 |
| 1,769,336 | Detaint et al. | July 1, 1930 |
| 1,831,324 | Seward | Nov. 10, 1931 |
| 1,832,787 | Penote | Nov. 17, 1931 |
| 1,892,521 | Vaughn et al. | Dec. 27, 1932 |
| 1,917,508 | DeWind | July 11, 1933 |
| 2,153,037 | Chaffins | Apr. 4, 1939 |
| 2,169,184 | French | Aug. 8, 1939 |
| 2,311,834 | Hollmann et al. | Feb. 23, 1943 |
| 2,574,799 | Seward | Nov. 13, 1951 |
| 2,609,910 | Lee | Sept. 9, 1952 |
| 2,644,574 | Mercier | July 7, 1953 |
| 2,648,422 | Kling | Aug. 11, 1953 |
| 2,710,466 | Chartier | June 14, 1955 |
| 2,737,733 | Everett | Mar. 13, 1956 |
| 2,812,867 | Anderson | Nov. 12, 1957 |
| 2,815,853 | Likens | Dec. 10, 1957 |
| 2,828,853 | Hart | Apr. 1, 1958 |

FOREIGN PATENTS

| | | |
|---|---|---|
| 445,755 | Germany | June 17, 1927 |